Oct. 18, 1966

KARL-HEINZ LESSER ET AL  3,279,892

ROTARY CHEMICAL REACTION FURNACE FOR FLOWABLE SUBSTANCES

Filed June 3, 1963  2 Sheets-Sheet 1

Inventors
KARL-HEINZ LESSER
INGOMAR SCHUMANN
HERMANN KRONACHER

BY Robert K. Jacob
AGT.

Oct. 18, 1966  KARL-HEINZ LESSER ET AL  3,279,892
ROTARY CHEMICAL REACTION FURNACE FOR FLOWABLE SUBSTANCES
Filed June 3, 1963  2 Sheets-Sheet 2
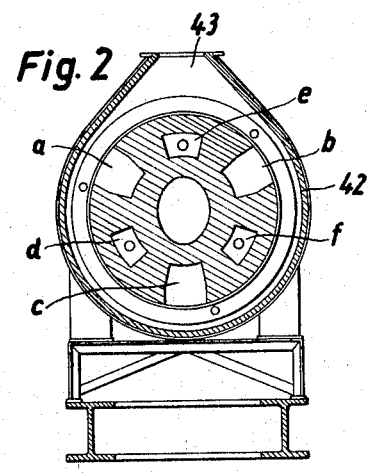
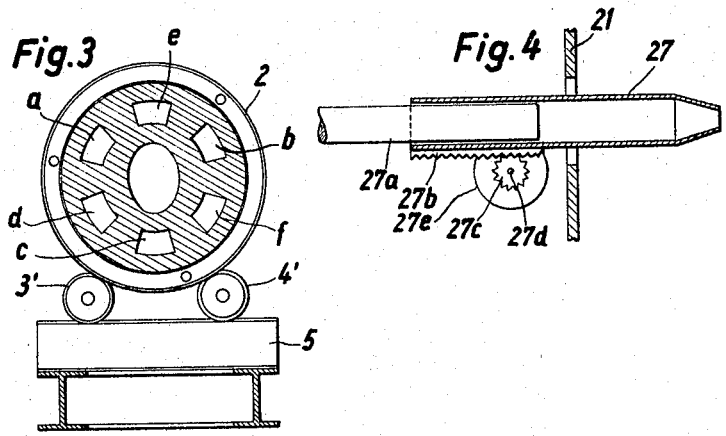
Inventors
KARL-HEINZ LESSER
INGOMAR SCHUMANN
HERMANN KRONACHER

3,279,892
ROTARY CHEMICAL REACTION FURNACE FOR FLOWABLE SUBSTANCES
Karl-Heinz Lesser, Morfelden, Ingomar Schumann, Mainz, and Hermann Kronacher, Trostberg-Mogling, Germany, assignors to Süddeutsche Kalkstickstoff-Werk AG., Trostberg, and Fellner & Ziegler G.m.b.H., Frankfurt am Main, Germany
Filed June 3, 1963, Ser. No. 285,075
Claims priority, application Germany, June 1, 1962, F 36,957
7 Claims. (Cl. 23—279)

The present invention relates to a method for carrying out chemical conversions between flowable solids and one or more reaction gases and to apparatus for practicing the method, particularly a revolving tubular kiln.

Methods are known for carrying out reactions between flowable substances and gases, where generally higher temperatures are employed which partly permit merely an interrupted but partly also a continuous manner of operation.

When stationary closed containers are used, only an interrupted or discontinuous method of operation is possible which, however, requires time consuming heating and cooling periods. Moreover, the application of this method is adversely affected by the presence of by-products which introduce interfering reactions.

The application of a revolving or whirling bed has the advantage of even heat distribution on the material to be treated as compared to the interrupted method. The equipment required for this purpose, however, is rather limited as to size. Moreover, in many instances these installations do not insure fully satisfactory operation over a long period of time, because owing to the inevitable friction, the originally chosen grain size of the processing means decreases in size.

For carrying out an uninterrupted continuous method it is essentially only possible to utilize a revolving drum especially then when reactions must be carried out which require a longer reaction time period. Thermo-neutral reactions do not take place momentarily, but require a certain time, so that particularly in such a case the use of a revolving drum is of advantage, because it makes available a correspondingly longer space utilizing time period.

Heretofore when revolving drums were used for carrying out chemical reactions that were not essentially of exothermic character, one or even all reaction components were preheated at least to reaction temperature before being fed into the revolving drum. The structural and operational difficulties connected with this heretofore prevented realization of such methods on a large scale, so that the customary methods of operation were found unsuitable in practice in connection with revolving drums of known construction.

A method for operating a revolving tubular kiln is also known which serves for chemical conversions between flowable substances and one or more reaction gases, to the reaction space of which the reaction components are fed without being preheated or being only slightly preheated, while operating under the counter-current principle. Here the reaction space is supplied with water vapor or a heating liquid by means of a device disposed between the reaction space and the outer mantle of the revolving kiln.

It is a primary object of the invention to provide a method for carrying out chemical reactions which are not essentially of exothermic character between flowable substances and one or more reaction gases at increased temperature while using a revolving drum, whereby an increased yield as well as a purer end product is obtained, i.e. a product of higher percentage. In practice the operation is to be continuous, and the method in accordance with the invention is to be employed for the continuous production of different materials which are formed by the reaction of solids and gases, for example, by the reduction with carbon monoxide. The method is of particular advantage for carrying out such reactions where thermally unstable gases, such as ammonia, carbon monoxide or hydrocyanic acid participate; this applies particularly for the production of calcium cyanide, calcium oxide and hydrocyanic acid, respectively, of calcium oxide+ammonia+carbon monoxide.

Accordingly, the invention resides in the first place in that the supply of the heat required for carrying out chemical reactions which are not essentially of exothermic character is effected at temperatures above the decomposition point by an outer fuel heating means for the reaction space over a substantial portion of the length of the reaction space or chamber. In this connection the discharge end of the revolving tubular kiln serves exclusively for the heat exchange and is designed intentionally without external heat supply. The external fuel heating for the reaction chamber is used to obtain by means of burners which are suitable for a fuel of liquid or gaseous composition the required essentially higher temperatures than what would be possible by means of water vapor or heated liquid.

Preferably the reaction space of the revolving drum is to be supplied exclusively with the reaction gas and material to be treated. The continuous revolving drum operation provides a particularly favorable yield, and the external heating of the drum that can be well regulated insures a purer product and a product of higher percentage without the admixture of hindering by-products. This is the case particularly with reactions where thermally unstable gases are used, because in the method in accordance with the invention their conversion takes place more rapidly than their decomposition.

In accordance with a preferred embodiment of the invention the method provides that the heat supplied by external heating means acts only on the actual reaction space formed by the center portion of the revolving drum, while the drum sections disposed ahead of and behind the reaction space are not subjected to heat. The sections of the revolving drum which are not heated and are disposed ahead of and behind this center portion which constitutes the reaction space, and which serve as supply and discharge end of the drum, improve the heat economy.

It is further proposed in accordance with the invention to provide in the reaction space of the rotary drum an increased atmospheric pressure with respect to the external normal pressure or with respect to the zone of the external heating of the revolving drum. In this manner the penetration of foreign gases, particularly heat gases or gases of combustion, into the reaction space of the drum is avoided. Since the wall of the drum is primarily of ceramic porous material, the penetration of combustion gases into the reaction chamber is avoided in a very desirable manner, because the excess pressure in the reaction chamber of the revolving drum prevents the penetration into the reaction chamber.

The invention is not only concerned with the method steps described but is also structurally concerned with features of the design of the drum and its external heating that are intended to provide for a particularly advantageous execution of the method in accordance with the invention. Accordingly the invention provides, between the reaction space and the mantle of the revolving drum, heating channels which pass through and which alternately are supplied from the intake end as well as also from the discharge end of the revolving drum with a fuel which is preferably of gaseous or liquid form. In this manner the heat supplied can be provided at temperatures that are relatively even along the entire length of the reaction space. The heating channels may be formed by recesses in the ceramic lining between the reaction space and the mantle of the revolving drum, and it is advisable in that event that the ceramic material for lining the heat channel differs in the direction towards the reaction space in such a manner that the heat conductivity from the outside towards the inside increases in order to conduct the flow of heat with relatively small radiation losses from the heating channel to the reaction space of the revolving drum.

In order to provide for satisfactory mixing of the material being treated and for increased contact surfaces for such material with the reaction gas, without components of the material being treated being held back for too long a time in the reaction space, even if only temporarily, the reaction space may preferably be arranged without any inserts, at least over an essential portion of its length, in which event the cross-sectional area is made elliptical in shape.

In this connection the degree of filling for the reaction space can be increased over 50%, if at the discharge end of the reaction space it leads to a discharge worm that is centrally arranged, the rotation of which should preferably be adjustable.

The material being treated can be fed into the revolving drum in a manner known per se by means of a supply worm. The housing of the supply worm may in accordance with the invention also be utilized as the discharge channel for the waste gases of the reaction and for pretreating the material to be treated, especially with heat.

Each through-going heat channel of the rotary drum is preferably associated with a burner for a liquid or gaseous fuel. This provides for efficient control of the heat supply which is obtained especially if the burner nozzles extend into the interior of the heating channel at an adjustable distance from the end wall of the rotary drum. A particularly reliable form of construction of the rotary drum is obtained if the burners and their fuel supply conduits are mounted in fixed position on the rotary drum. The individual heating channels then can be associated at their discharge ends with a waste or combustion gas ring channel which is also stationary and which encompasses the mantle of the rotary drum. If the burners are alternately mounted at the ends of the heating channels, then two waste gas ring channels are sufficient for a rotary drum.

Further objects and advantages of the invention will become apparent from the following specification with reference to the accompanying drawings, in which:

FIG. 2 is a section along the line A—A of FIG. 1;

FIG. 3 is a section along the line B—B of FIG 1; and

FIG. 4 is a detail in section of the adjustable burner nozzle shown to an enlarged scale.

Figure 1:
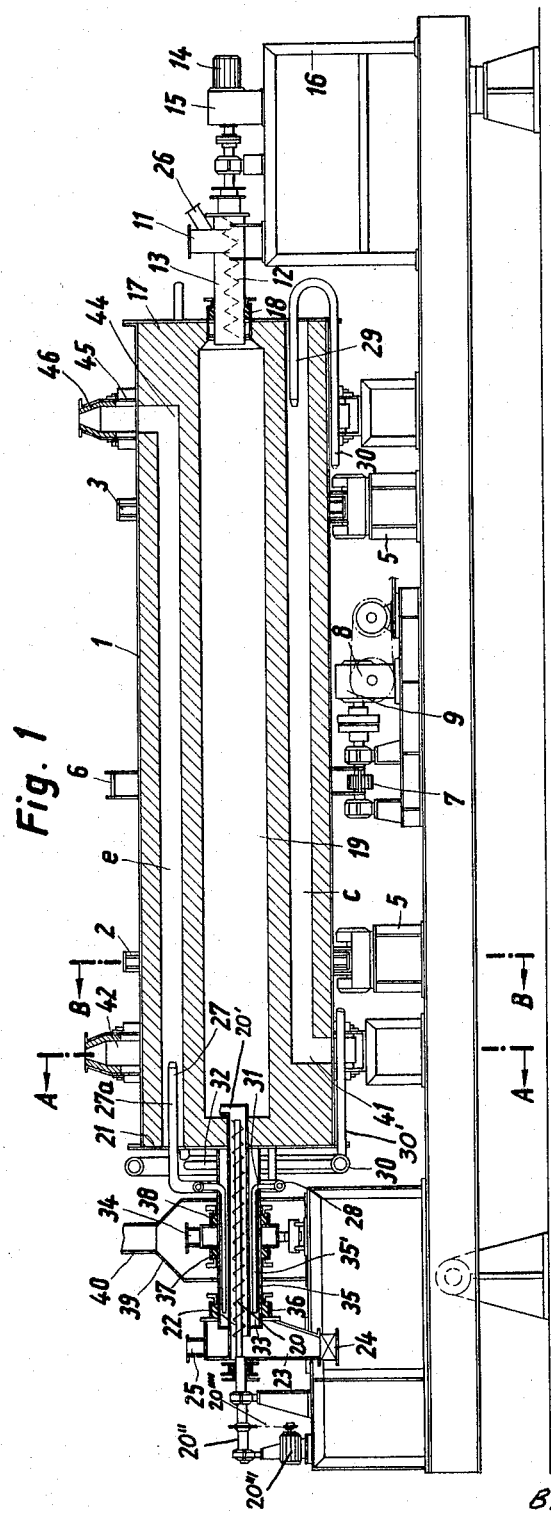
FIG. 1 is a rotary drum with an associated heating means, shown partly in section.

The rotary drum 1 is provided with two race rings 2 and 3 which are supported on runner rollers 3', 4' which in turn are journalled in a supporting frame 5. The drum is driven by way of a circular tooth rack 6, a pinion 7 and by means of the transmission 8 and motor 9.

The material being treated is supplied to the feed worm 12 by way of supply shaft 11. The worm 12 is journalled in the housing or trough 13. The supply worm 12 is driven by the flange motor 14 that is provided at the transmission in housing 15. The housing 13 and its drive means as well as the supply shaft are fixedly mounted on the supporting frame 16. A seal or gasket 18 is provided between the housing 13 and the end wall 17 of the rotary drum.

The rotary drum 1 has a lining made of ceramic material in a manner that a reaction space 19 is formed, the cross-section of which is elliptical, as shown by FIGS. 2 and 3.

The discharge end of the rotary drum 1 is proximate the end wall 21 into which projects the discharge tube 22. A discharge worm 20 is arranged in the centrally disposed discharge tube 22 and has an upwardly extending material feed shaft 20' which projects into the reaction chamber 19. The drive for the shaft 20'' of the discharge worm 20 is obtained by a continuously adjustable motor 20''' by way of the chain drive 20''''. The material being treated must, as it leaves the rotatable drum, pass through the discharge tube 22 and then enter the discharge shaft 23, at the discharge end 24 of which a gas-proof sluice device of a type known from the prior art may be connected, which since it is known is not shown in the drawings and need not be described in detail.

The reaction gas to be used is supplied by way of the supply shaft 25 into the discharge shaft 23 and thus to the discharge tube 22 and the reaction space 19. The reaction waste gas leaves the drum 1 by way of the housing 13 and its discharge tube 26.

In accordance with the invention illustrated, six heating channels are provided in the ceramic lining of the rotary drum 1. These are, on the one hand, channels $a$, $b$, $c$, and on the other hand, channels $d$, $e$, $f$. The channels $a$, $b$ and $c$ are each provided with a burner 27, and the burners are connected by means of a fuel supply conduit 27a to a burner ring conduit 28 at the discharge end of the rotary drum 1. The heating channels $d$, $e$ and $f$ are each equipped at the intake end of the rotary drum with a burner 29. The heat supply conduits 30' of these burners 29 are brought along the entire length of the rotary drum 1 and merge with the annular conduit 30 at the discharge end of the rotary drum 1. The annular conduits 28 and 30 are in turn connected by way of tubular connecting members 31, 32 with an annular hollow space 33 which surrounds the discharge tube 22. The supply of the fuel, which may be liquid or gaseous, can take place by way of shaft 34 into the annular hollow space 33. The annular conduits 28, 30, the burners 27 and 29, as well as their fuel supply conduits 30, 31, 32, are rigidly mounted together with discharge tube 22 and the tubular mantle 35 forming the annular hollow space 33 provided on the rotary drum 1, so that between this mantle 35 and the discharge shaft 23 a seal 36 is provided. In order to protect the fuel supply through the shaft 34 into the rotating tube 35 which is provided with slots, further seals 37, 38 and a housing 39 with a venting tube 40 are provided.

The gas channels $a$, $b$ and $c$ have angularly offset gas discharge ends 41 which lead into the exhaust gas ring channel 42, which is stationary and surrounds the rotary drum 1 proximate the discharge end. The exhaust gas can be discharged by way of the outlet ends 43 through a gas conduit (not shown). Also the angularly offset ends 44 of the heating channels $d$, $e$ and $f$ lead to an annular exhaust gas channel 45 which is stationary and encompasses the rotary drum 1 at the intake end. Also here the exhaust gases can be led to the open air through the shaft 46 and a waste gas conduit (not shown).

By virtue of the fact that the burners 27 at the discharge end of the rotary drum 1 lead into their associated heating channels, while the burners 29, on the other hand, lead into their associated heating channels at the intake end of the rotary drum, and these latter channels are separated from the heating channels of the burners 27, it is possible to provide generally even heating of the reaction chamber 19 along its entire length. Such even heating would also be attainable, for example, by a suitable electrical external heating means around the rotary drum 1.

The burners 27 and 29 may be designed in a manner to be axially adjustable so that the distance between burner 27 and burner 29 can be suitably regulated. This adjustability of burner nozzle 27 is shown by way of example in FIG. 4. The burner nozzle 27 and the burner supply conduit 27a are longitudinally telescopically adjustable by means of the toothed rack 27b on the burner nozzle. The toothed rack 27b is engaged by the pinion 27c, the shaft 27d of which can be turned by means of a hand wheel indicated at 27e. The end wall 21 of the rotary kiln is also indicated in FIG. 4.

By means of this arrangement the length of the actual reaction space can be adjusted so that sections of the reaction chamber 19 are constituted at the intake end and discharge end of the rotary drum which need not be used, at least not essentially for the actual reactions, but which are rather pre-heating and cooling zones within the space 19, which is of elliptical cross-section.

The elliptical cross-section of the reaction chamber 19 insures to a greater extent the thorough mixing of the material being treated in the reaction chamber. Tests have shown that by virtue of the elliptical construction the mixing effect on which the yield as well as the even movement of the solid material depends is increased one and one-half times. The discharge tube 22, which is of considerably smaller diameter, together with the discharge worm 20 insures of the drum being filled to a high degree, so that the reaction gas fed into the reaction chamber 19 by way of shaft 25 comes into intimate contact with the material being treated.

The lining of the rotary drum 1 is made of a ceramic material the heat conductivity of which increases as seen from the heat channels in the direction toward the reaction chamber 19, so that the heat produced by the external heating flows preferably in the direction of the reaction chamber 19 without any essential radiation losses through the mantle of the rotary drum 1. If the reaction gas in the reaction chamber 19 is under pressure, then the gases of combustion in the heat channels cannot enter from the heat channels through the lining material into the reaction space 19. Thus, if merely the material to be treated and the reaction gas are to be fed to the reaction chamber, as preferred in accordance with the invention, then a very pure end product of high percentage can be expected. The rotary drum 1 provides for continuous operation, and the degree of filling of the rotary drum can be maintaintd at a high level, so that the yield obtained by means of this method is particularly high with this apparatus.

Having now described our invention with reference to the embodiment illustrated in the drawings, we do not wish to be limited thereto, but what we desire to protect by Letters Patent of the United States is set forth in the appended claims.

We claim:
1. Rotary furnace for producing chemical reactions between flowable solids and reaction gases comprising, an outer mantle rotatably mounted, a wall lining defining a generally tubular reaction chamber extending longitudinally of said mantle and having a material supply intake at one end and a discharge aperture at the other end, a plurality of heating channels extending in said lining intermediate said mantle and said reaction chamber and longitudinally of said structure over a substantial portion of the length thereof in non-communicative relationship to said reaction chamber, burner means including fuel nozzles extending into said channels and fuel supply conduits therefor, said nozzles being mounted for rotation with said furnace, and a stationary common fuel supply disposed at one end of said furnace in communication with said nozzles by way of said conduits, said heating channels and nozzles extending alternately from said one end having said material supply intake and from said other end.

2. Rotary furnace in accordance with claim 1, where said fuel nozzles extend into said channels from the end walls of said furnace and means are provided operative to adjust the positions of said nozzles in said channels.

3. Rotary furnace in accordance with claim 2, where said wall lining is made of ceramic material having a heat conductivity which increases inwardly in the direction of said reaction chamber.

4. Rotary furnace in accordance with claim 3, where said reaction chamber is of generally oval cross-section and retarding means such as a worm are provided at the discharge end of said chamber.

5. Rotary furnace in accordance with claim 3, where the discharge end of said furnace is provided with a discharge shaft housing said retarding means and a gas-proof sluice device and the intake end includes a worm adapted to feed in material to be treated and to permit the off-flow of waste gases.

6. Rotary furnace in accordance with claim 1, where each of said channels has an end extending outwardly through said mantle and stationary annular channels are arranged circumferentially of said mantle for receiving the off-flow of the heating gases.

7. Rotary furnace in accordance with claim 5, where a reaction gas supply shaft is provided proximate the end of said retarding means at said discharge end and gas for reacting with the material being treated is introduced through said supply shaft and by way of said discharge shaft into said reaction chamber.

References Cited by the Examiner
UNITED STATES PATENTS

| | | | |
|---|---|---|---|
| 596,533 | 1/1898 | Naef | 23—279 |
| 968,485 | 8/1910 | Ladd et al. | 263—33 |
| 2,063,233 | 12/1936 | Debuch | 23—277 |
| 2,507,123 | 5/1950 | Sproule et al. | 23—277 |
| 2,890,929 | 6/1959 | Rummert | 23—1 |
| 2,937,923 | 5/1960 | Shapleigh | 23—1 |
| 3,021,202 | 2/1962 | Peirce et al. | 23—286 |

MORRIS O. WOLK, *Primary Examiner.*

MAURICE A. BRINDISI, JAMES H. TAYMAN, JR.,
*Examiners.*

E. STERN, *Assistant Examiner.*